United States Patent [19]
Patel et al.

[11] Patent Number: 6,086,997
[45] Date of Patent: Jul. 11, 2000

[54] FAST-SETTING POLYCHLOROPRENE CONTACT ADHESIVES

[75] Inventors: Vijay Patel; Daniel W. Wuerch, both of London, Canada

[73] Assignee: 3M Innovative Properties Company, St. Paul, Minn.

[21] Appl. No.: 08/888,715

[22] Filed: Jul. 7, 1997

Related U.S. Application Data

[60] Provisional application No. 60/047,175, May 20, 1997.

[51] Int. Cl.$^7$ .............................. C09J 7/02; C09J 111/00; C09J 111/02
[52] U.S. Cl. .................................. 428/355 BL; 524/405; 524/552
[58] Field of Search ..................... 428/355 BL; 524/405, 524/552

[56] References Cited

U.S. PATENT DOCUMENTS

| | | | |
|---|---|---|---|
| 3,542,727 | 11/1970 | Saville | 260/45.7 |
| 4,205,103 | 5/1980 | Davis et al. | 427/373 |
| 4,240,860 | 12/1980 | Pole et al. | 156/327 |
| 4,921,892 | 5/1990 | Moore et al. | 524/61 |
| 5,527,853 | 6/1996 | Landy et al. | 524/521 |
| 5,610,239 | 3/1997 | Skelley | 525/331.7 |

FOREIGN PATENT DOCUMENTS

| | | |
|---|---|---|
| 0 470 928 A1 | 2/1992 | European Pat. Off. . |
| 0 624 634 A1 | 11/1994 | European Pat. Off. . |
| 59-230074 | 12/1984 | Japan ................................. C09J 3/14 |
| 1219782 | 1/1971 | United Kingdom . |

OTHER PUBLICATIONS

Gerlach, Dieter, "Polychloroprene–An Evergreen Product for the Formulation of Water Based Contact Adhesives", *Advances in Adhesives & Sealants Technology*, Pper 14, 1994.

Carl, J.C., "Chapter II—Fluid Properties", *Neoprene Latex: Principles of Compounding and Processing*, E.I. DuPont de Nemours & Co., pp. 7–21, 45–46, 1962.

Gelbert, C. H., *Heoprene Latex: Basic Compouding of Neoprene Latex*, E–27917–1, E.I. DuPont de Nemours & Co., pp. 2–11, 1986.

Christell, Lance, "Polychloroprene", *WaterBorne Short Course*, Selected handouts and overheads, May 19–21, 1997.

*Primary Examiner*—Jenna Davis
*Attorney, Agent, or Firm*—Lisa M. McGeechan; Steven E. Skolnick; Scott A. Bardell

[57] ABSTRACT

The invention relates to a storage stable, fast-setting, aqueous contact adhesive composition comprising an adhesive component and boric acid. The composition can further include an amino acid, such as glycine. The composition finds particularly preferred use for bonding substrates, such as foam, in the furniture industry.

26 Claims, No Drawings

FAST-SETTING POLYCHLOROPRENE CONTACT ADHESIVES

CROSS-REFERENCE TO RELATED APPLICATION

This application claims priority to U.S. Provisional Patent Application No. 60/047,175, filed May 20, 1997.

FIELD OF THE INVENTION

This invention relates to adhesive compositions, especially aqueous-based contact adhesive compositions useful in the furniture industry.

BACKGROUND OF THE INVENTION

In the furniture industry, and related industries, a wide range of substrates must be adhered, including wood; metal, such as cold-rolled steel and aluminum; fabric; paper; foam; plastic, such as polyvinylchloride, polystyrene, polyethylene, polypropylene, and acrylonitrile butadiene styrene (ABS); fiberglass; and materials used to construct high pressure laminates, for example, for counter tops. In the past, foam and furniture manufacturing has been dominated by one-part contact adhesives dissolved or dispersed in organic solvents, such as chlorinated solvents and low flash point organic solvents. Such one-part contact adhesives are conveniently able to be applied using a single source (i.e., container). Recently, however, there has been a desire to shift from organic, solvent-based adhesive compositions to aqueous-based or aqueous-dispersed adhesive compositions for environmental, health, and safety reasons.

Many contact adhesive applications require that soon after applying the adhesive to the substrates to be contacted and pressing the coated substrates together, the adhesive rapidly bonds to itself. That is, the adhesive undergoes auto adhesion and forms a semi-solid film with sufficient strength to hold the substrates together and resist subsequent forces on the fresh bondline that might cause failure. Adhesives that provide the desired quick strength properties immediately after bonding can be referred to as "fast-set" adhesives. To determine whether an adhesive is a fast-set adhesive, a finger bond test may be utilized. Quick-drying organic solvents have been conventionally utilized as carriers for fast-set contact adhesives since their quick-drying film forming properties facilitate short set times and quick holding together of the bonded parts after their coated surfaces are mated and pressed together.

To comply with consumer demand, it would be desirable to find an aqueous-based contact adhesive that facilitates fast adhesive set times. Attempts to provide them in one-part form, however, have experienced only gradual industry acceptance since they have had longer dry times than conventional organic, solvent-based adhesives, as well as a relatively slow rate of strength build. To overcome such limitations, two-part (i.e., co-sprayed from two separate containers) aqueous-dispersed adhesive systems have been developed that demonstrate high adhesive strength within seconds of spraying. The adhesive composition is one part of the two-part system and an external coagulant, such as citric acid, lactic acid, acetic acid, or zinc sulfate, is typically used as the second part in a predetermined ratio. Such two-part adhesive systems, however, are not entirely satisfactory. The co-spraying equipment is expensive, the equipment requires maintenance, and the ratio of the two parts (the coagulant and the adhesive composition) must be monitored during application. Thus, there is a need for a one-part, aqueous-based, fast-setting, contact adhesive.

Polychloroprene has been used as an aqueous-based adhesive. For example, see Pole et al. (U.S. Pat. No. 4,240,860), where a substantially solvent-free, aqueous-based adhesive composition comprises 2-chloro butadiene. The composition is stabilized with an emulsifier that forms aqueous-insoluble compounds with zinc or cadmium ions. The pH of the adhesive formulation is preferably above 9.5, and more preferably 10.3 to 11.5. Also see, Gerlach ("Polychloroprene-An Evergreen Product for the Formulation of Water Based Contact Adhesives," *Advances in Adhesives & Sealants Technology*, paper 14), where polychloroprene is suggested as a potentially suitable aqueous-based adhesive. Gerlach mentions that polychloroprene is also often blended with an acrylate dispersion. The acrylate dispersion "provides some initial tack and also a destabilizing effect which accelerates coagulation." (See Gerlach, p. 10).

Polychloroprene has also been used to bond foam. See Simmler et al. (European Patent Office Publication No. 0 624 634 A1), where polychloroprene is used as a copolymer with acrylate acidic ester copolymers. Boric acid is mixed into a one-part, sprayable dispersion of the copolymers. However, one problem that has been found with many of the conventional, one-part, adhesive compositions using polychloroprene is that the compositions have a short shelf life. That is, after extended storage, the compositions coagulate, rendering their application problematic, particularly when spray-coating. The problem is even more pronounced when the compositions are stored at elevated temperatures.

Fast-set contact adhesives have not been obtained without decreasing storage stability. To date, short set times and storage stability have not been satisfactorily obtained within the same adhesive composition in a one-part system. The problem has been that in order to achieve a fast-setting adhesive composition, it is necessary to find some additive or additives to make the resulting adhesive composition sensitized and unstable enough that the colloid polymer system immediately "breaks" on application and forms a high strength film, but yet does not make the composition unstable to the point that it will coagulate during storage and before application. Such additives are sometimes referred to as internal coagulants. Additives used to sensitize anionic-stabilized latex compounds and improve their ability to break upon application are often acidic. For example, Carl, J. C. ("Fluid Properties," *Neoprene Latex: Principles of Compounding and Processing*, E.I. DuPont de Nemours & Co., p. 18 (1962)) discusses the use of glycine as an amino acid that controllably destabilizes latex compounds containing anionic surfactants. Glycine acts to destabilize the compound by reducing the pH of the system.

Polychloroprene systems often require special considerations. For example, polychloroprene dispersions can be prepared with stabilizers to compatibilize the polychloroprene with its carrier. See Carl, J. C. ("Fluid Properties," *Neoprene Latex: Principles of Compounding and Processing*, E.I. DuPont de Nemours & Co., pp. 9–11 (1962)) for a discussion of suitable stabilizers. Strong alkali components, such as potassium hydroxide, can also be added to the adhesive system to stabilize the composition during storage (i.e., provide storage stability) by raising the pH of the system. They also neutralize and prevent formation of hydrochloric acid as some of the chlorine on the polychloroprene molecule normally becomes detached from the polymer during long term storage of the latex. Commercially available polychloroprene dispersions commonly have pH values as high as 12 to 13.

It has also been difficult to find satisfactory polychloroprene compositions for use in demanding applications where a fast-setting contact adhesive is necessary. One example of such an application is the formation of pinch bonds during manufacture of foam rubber cushions used in furniture. Pinch bonds, or knife-edge bonds, require even more strength build-up than needed to form a finger bond. Thus, fast-setting contact adhesives are even more important for such demanding applications.

Thus, there is a need for an aqueous-based polychloroprene contact adhesive that is available in one-part form. The contact adhesive must be storage stable, yet capable of fast-setting. It is also desirable that the contact adhesive be capable of developing enough strength for demanding applications within a short period of time.

SUMMARY OF THE INVENTION

According to the present invention there is provided a storage stable, fast-setting, aqueous contact adhesive composition comprising an adhesive component and boric acid. The boric acid is utilized as an internal coagulant and can be added in the form of a solution, or it can be generated in-situ. The boric acid is preferably present in an amount of about 0.1% to about 6% by weight based on the dry weight of the total adhesive component, and more preferably in an amount of about 0.8% to about 1.5% by weight based on the dry weight of the total adhesive component.

The adhesive component comprises at least one polychloroprene. The adhesive component can also optionally comprise a mixture of polychloroprene and natural rubber, synthetic rubber, or combinations thereof. There are a wide variety of polychloroprenes available. For example, the adhesive component can be at least one anionic surfactant-stabilized polychloroprene dispersion or anionic/nonionic surfactant-stabilized polychloroprene blend dispersion. The adhesive component is also substantially free of acrylates. By "substantially free," it is meant that the component contains 5% by weight or less of acrylates. Preferably, the component contains 3% by weight or less of acrylates, and more preferably, 1% by weight or less of acrylates.

The composition can also contain an amino acid as an internal coagulant, such as glycine, preferably in an amount of about 0.5% to about 5% by weight based on dry weight of the total adhesive component, and even more preferably in an amount of about 1.5% to about 2.5% by weight based on the dry weight of the total adhesive component.

The addition of boric acid enables the pH of the polychloroprene adhesive composition to be lowered whilst still maintaining good shelf life. "Shelf life" refers to the time period after which the aqueous composition has substantially coagulated, congealed, curdled, separated, settled, or formed non-easily mixable or non-easily dispersible layers so that it may not be usefully or readily applied as a homogeneous, uniform liquid blend by spray-coating methods. That is, compositions that have good shelf life are storage stable. By "storage stable," it is meant that the aqueous compositions have a shelf life of greater than about four months when stored at room temperature (25° C. S.T.P.). Preferably, the aqueous compositions have a shelf life of greater than about 6 months, and more preferably greater than about 8 months when stored at room temperature.

"Fast-setting," as used herein, refers to an adhesive composition that develops strength sufficient to form a bond when finger pressure is applied (i.e., a finger bond) in less than about 10 minutes after application of the adhesive to the substrate to be bonded. Preferably, fast-setting contact adhesives develop a finger bond within about 5 minutes or less after application. For some utilities, particularly when bonding foam in the furniture industry, fast-setting contact adhesives preferably develop a finger bond within 90 seconds or less after application.

The compositions are fast-setting due to the low pH of the compositions. It is preferred that the compositions have a pH in the range of about 7 to about 9.5. More preferably, the pH of the compositions is about 7.5 to about 9, even more preferably from about 8.0 to about 8.9, and most preferably from about 8.5 to 8.8.

The combination of a fast-setting aqueous contact adhesive that is also storage stable is quite advantageous. It is even more preferable that the composition is in one-part form. That is, compositions according to the present invention are conveniently able to be applied, such as by spraying, from one container. Thus, the compositions can be supplied in a single container. The compositions can then be conveniently applied to a substrate.

DETAILED DESCRIPTION OF THE PREFERRED EMBODIMENTS

Aqueous-based adhesive compositions according to the present invention comprise polychloroprene in the form of a dispersion. Thus, the dispersion contains at least an adhesive component and an aqueous carrier. By "aqueous," it is meant that the carrier is primarily water. However, organic solvents may be present, so long as they do not substantially compromise storage stability of the composition. Incidental solvents, such as those present in additives and commercially available components may also be present. Preferably, however, "aqueous" refers to a 100% water carrier.

Polychloroprene, as used herein, refers to a homopolymer or copolymer of chloroprene (2-chloro-1,3-butadiene). Comonomers for use in copolymers include a wide variety of compounds such as styrene, vinyl toluene, 2,3-dichlorobutadiene, acrylic acid, methacrylic acid, and derivatives such as methacrylates, acrylates, and acrylonitriles.

The adhesive component of the present invention includes at least polychloroprene. Polychloroprene is readily available as an aqueous dispersion, such as a latex or emulsion. Whilst a broad range of dispersions are suitable, useful commercially available dispersions generally have from about 30% to about 65%, more usually from about 45% to about 60%, preferably from 40% to 50% or 60% by weight solids content. The dispersions generally have a particle size in the range of from about 0.1 microns in diameter to about 0.4 microns in diameter, depending on the specific grade.

Polychloroprene dispersions are typically stabilized to prevent the dispersion from coagulating during storage. By stabilization, it is meant that the pH is raised to prevent coagulation due to a decrease in the pH. As the pH drops to 10 or below, there is a tendency to coagulate. The pH tends to drop gradually on storage. Therefore, as mentioned above, commercially available polychloroprene dispersions often include a strong alkali, such as potassium hydroxide, and may have a pH anywhere from about 10 to about 13, but commonly from about 12 to about 13.

Any suitable stabilizer may be utilized. For example, surfactants may be added to stabilize the dispersion, usually anionic or nonionic surfactants. Thus a dispersion referred to as an anionic surfactant-stabilized polychloroprene is a polychloroprene dispersion stabilized by an anionic surfactant. Anionic surfactant-stabilized polychloroprene dispersions or anionic/nonionic surfactant-stabilized polychloroprene dispersion blends are preferred, however, for the present compositions.

Suitable anionic surfactant-stabilized polychloroprene dispersions include those available from DuPont Dow Elastomers under the tradenames: LATEX 750 ("750"); AQUASTIK GRADES AQS2920, AQS2540, AQS2126 and AQS9426 ("2920", "2540", "2126" and "9426"). Another suitable anionic surfactant-stabilized polychloroprene dispersion is DISPERCOLL C74 available from Bayer ("C74"). A suitable anionic/nonionic surfactant-stabilized polychloroprene blend dispersion is available from Bayer under the name DISPERCOLL C84 ("C84"). A suitable sol polymer polychloroprene dispersion is available from DuPont Dow Elastomers under the name LATEX 735 ("735").

Polychloroprene is available in a wide variety of types, from low to high crystallinity, and from low to medium or high gel. The type of polychloroprene used can influence the ability of the composition to achieve a fast-set time and other properties of the resulting bond. The effects from the choice of polychloroprene can be seen in the examples following.

Besides polychloroprene, the adhesive component may also contain natural rubber, another synthetic rubber, or combinations thereof. Preferably, such natural and synthetic rubbers have unsaturated chains derived from units such as butadiene or have units derived from $C_4$ to $C_{10}$ conjugated dienes, such as styrene or methyl methacrylate. Natural rubber is commercially available as modified general purpose latex. For example, modified latex is available as MEGAPOLY latex, as MG 49, and as MG 30 (rubber latices grafted with methyl methacrylate and available from H. A. Astlett and Co., Inc.). Other synthetic rubbers include homopolymers of butadiene, isoprene, or dimethyl butadiene. Other useful synthetic rubbers include copolymers of butadiene and styrene, isoprene and styrene, butadiene and dimethyl butadiene, butadiene and acrylonitrile, isoprene and acrylonitrile, dimethyl butadiene and styrene, butadiene and vinyl toluene, or isoprene and vinyl toluene. A suitable commercially available synthetic rubber is ROVENE 8329 (a modified styrene butadiene rubber latex emulsion available from Mallard Creek).

Preferably, the adhesive component is substantially free of acrylates. By "substantially free," it is meant that the component contains 5% by weight or less of acrylates. Preferably, the component contains 3% by weight or less of acrylates, and more preferably, 1% by weight or less of acrylates.

More than one type of polychloroprene can be blended together to form the adhesive component. The adhesive component can also be a blend of polychloroprene and natural rubber and/or other synthetic rubbers. Blending is permitted so long as the aggressiveness or initial bond strength of the compositions is not significantly compromised. If the adhesive component is a blend of polychloroprene and natural rubber it is preferred that the rubber ranges from about 10% to about 90%, more preferably from about 30% to about 60% based on the dry weight of the total adhesive component.

Boric acid is added to the aqueous dispersion as an internal coagulant to form the resulting one-part contact adhesive. The addition of boric acid enables the pH of the polychloroprene adhesive composition to be lowered whilst still maintaining good shelf life.

"Shelf life" refers to the time period after which the aqueous composition has substantially coagulated, congealed, curdled, separated, settled, or formed non-easily mixable or non-easily dispersible layers so that it may not be usefully or readily applied as a homogeneous, uniform liquid blend by spray-coating methods. That is, compositions that have good shelf life are storage stable.

By "storage stable," it is meant that the aqueous compositions have a shelf life of greater than about four months when stored at room temperature (25° C. S.T.P.). Preferably, the aqueous compositions have a shelf life of greater than about 6 months, and more preferably greater than about 8 months when stored at room temperature. When stored at an elevated temperature of 50° C., the compositions are preferably storage stable for at least 24 hours, more preferably 1 week, and still more preferably 2 to 4 weeks or more.

Lowering the pH allows the composition to "break" quickly upon application, providing a fast-setting contact adhesive. "Fast-setting," as used herein, refers to an adhesive composition that develops strength sufficient to form a bond when finger pressure is applied (i.e., a finger bond) in less than about 10 minutes after application. Preferably, fast-setting contact adhesives develop a finger bond within about 5 minutes or less after application. For some applications, particularly when bonding foam in the furniture industry, fast-setting contact adhesives preferably develop a finger bond within 90 seconds or less after application.

Previously, it was believed that below a pH of about 9.5, particularly below about 9, polychloroprene compositions would lose their storage stability. According to the present invention, it is preferred that the adhesive compositions have a pH in the range of about 7 to about 9.5, more preferably from about 7.5 to about 9, still more preferably from about 8.0 to about 8.9 and most preferably from about 8.5 to about 8.8. The ability of the present invention to provide such a low pH composition that is storage stable has not been accomplished previously. The low pH of the composition allows it to be fast-setting, as demanded by consumers.

Boric acid is typically available as a powder. United States Borax and Chemical Corporation (Boron, Calif.), North American Chemical Corporation (Trona, Calif.), and Technic, Inc. (Cranston, R.I.) are a few of the commercial suppliers of boric acid. Although boric acid usually refers to orthoboric acid, any form of boric acid, such as metaboric acid, is suitable. It is preferred that the boric acid is at least 99% pure.

Boric acid is preferably added to the aqueous polychloroprene dispersion as a solution of up to about 5% by weight in water (when measured at room temperature). However, the boric acid can alternatively be generated in situ. For example, boric acid can be generated by the hydrolysis of boric anhydride or boric acid esters, such as trimethoxyborane and triethoxyborane. When formulating the compositions of the invention, the boric acid is preferably added in the form of a solution to avoid destabilizing the polychloroprene dispersion. It is preferred to use from about 0.1% by weight to about 6% by weight, preferably about 0.8% by weight to about 1.5% by weight based on the dry weight of the total adhesive component. Typically, in parts per hundred (phr), boric acid is added in an amount of about 0.5–2.5 phr dry weight of the total adhesive component, preferably in an amount of about 0.75–1.25 phr dry weight of the total adhesive component. Thus, the weight ratio of total adhesive component to boric acid would generally be in the range of about 200:1 to about 40:1, preferably about 133:1 to about 80:1.

It is preferred that the compositions also contain an amino acid. Water soluble, lower molecular weight, amino acids are suitable, such as glycine, alanine, valine, lysine, isoleucine or leucine. Glycine is preferred due to its relatively high solubility in water and relatively low cost. Glycine is readily available commercially, for example, from Hampshire Chemical Company. Technical or food grade purity is sufficient. Preferably, the amino acid is used as a solution which can be from about 5% by weight to about 25% by weight, preferably about 5% by weight to about 20% by weight, more preferably about 10% by weight to about 18% by weight, especially if glycine is the amino acid utilized. The quantity of amino acid to be added to the compositions, if an amino acid is used, can vary from about 0.5% by weight to about 5% by weight and preferably from about 1.5% by weight to about 2.5% by weight based on the dry weight of the total adhesive component. In parts per hundred (phr), preferably about 1.5 to about 2.5 phr based on dry weight of the total adhesive component is added.

Other optional additives that may be used in the composition include tackifiers, antioxidants, acid acceptors, viscosity modifiers or thickeners, surfactants, stabilizers, pigments, fillers, and preservatives.

If tackifiers are used, then up to about 50% by weight, preferably about 30% by weight, and more preferably about 5% by weight to about 20% by weight based on the dry weight of the total adhesive component, would be suitable. About 25 to about 60 phr based on dry weight of the total adhesive component would also be suitable. Suitable tackifiers for use with polychloroprene dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion. The tackifier will generally be used in the form of an aqueous dispersion. Commercially available tackifiers that are suitable include TACOLYN 5001 and 5002 (aqueous, 55% solids synthetic resin dispersions based on low molecular weight thermoplastic resins, available from Hercules Inc.), SE1055 (an aqueous dispersion of a rosin ester, available from Hercules Inc.), ESCOREZ 9271 (an aliphatic hydrocarbon resin emulsion, available from Exxon), DERMULSENE 82, DERMULSENE 92, DERMULSENE DT or DERMULSENE DT50 (aqueous dispersions of modified terpene phenolic resins, available from DRT) and AQUATAK 4188 (a modified rosin ester, available from Arizona Chemical Company).

Polychloroprene can be degraded by oxidation or ultraviolet radiation. Degradation of the polychloroprene results in the undesirable release of hydrochloric acid. Such degradation causes softening of the bond line and substrate tenderizing in which the substrate weakens due to the presence of the acid. Antioxidants can be added to the composition to prevent such degradation. Thus, it is preferred to add antioxidants to prevent oxidative degradation of the polychloroprene. Suitable antioxidants are dispersions of hindered phenols, such as SANTOWHITE or WINGSTAY L (both available from Akron Dispersions Inc.) or, if discoloration is not important, amine-type antioxidants can also be used. OCTOLITE 640 (available from Tiarco Chemical) is also suitable and is a 55% emulsion blend 50:50 by weight of a polymeric hindered phenol and a thioester. Typically, about 1 to about 2 phr of antioxidant are added based on dry weight of the total adhesive component.

To minimize the effects of degradation, acid acceptors can also be added to the composition. It is preferred to add acid acceptors to neutralize the resulting release of hydrochloric acid. A typical acid acceptor is a zinc oxide dispersion. Aqueous epoxy resins, such as EPI-REZ 3519, EPI-REZ 3515 and EPI-REZ 5003 (available from Shell Chemical Company) are also suitable. Typically, about 1 to about 6 phr of acid acceptor may be added based on dry weight of the total adhesive component. Zinc oxide dispersions are available from Tiarco Chemical as OCTOCURE 462 and 803.

Viscosity modifiers may be added to thicken the compositions. Suitable thickeners include hydrophobically modified, alkali-soluble, acrylic compounds, such as ACRYSOL RM5 and ACRYSOL ASE 95 (available from Rohm and Haas Company), hydrophobically modified urethanes, such as NOPCO DSX 1550 (available from Henkel Canada Ltd.), and nonionic, water soluble polymers derived from cellulose, cellulose ethers and carboxymethyl celluloses, such as NATROSOL 250 (a hydroxyethylcellulose supplied by Hercules Inc.), or inorganic thickeners, such as fumed silica. Thickeners can normally be used at up to about 1% by weight of the dry weight of the total adhesive component.

Uncompounded polychloroprene latex generally has good mechanical and storage stability, but the composition may require the incorporation of additional surfactants, wetting agents, or stabilizers. Surfactants, such as MODICAL S (a sulfonated fatty product, available from Henkel Corp.), EMULVIN W (aromatic polyglycol ether, available from Bayer Corporation), and DARVAN WAQ (sodium lauryl sulfate, available from R. T. Vanderbilt Company Inc.) are suitable. Typically they would be added at up to about 2 phr based on dry weight of the total adhesive component.

Pigments may be added to color the compositions. Suitable pigments are available as powders, which are water dispersible, or as aqueous dispersions. Some suitable pigments include Phthalocyanine Green and Blue Pigment Dispersion (both available from Hilton Davis Chemical Co.), Orange Pigment Aqueous Dispersion (available from Engelhard Corporation), and Carbon Black Aqueous Dispersion (available from Technical Industries Inc.). Typically, pigments may be added at up to about 0.2 phr based on dry weight of the total adhesive component.

Preservatives, such as biocides, may be added to prevent such storage problems as bacterial or fungal attack. Suitable preservatives include TROYSAN 586 (available from Troy Corp.) and VANCIDE 51 (available from RT Vanderbilt). Typically, such compounds may be added at about 500 parts per million (ppm) to about 1500 ppm based on the wet weight of the total composition.

The aqueous contact adhesive compositions can be prepared by mixing the ingredients together at room temperature. Normal, low shear mixing equipment can be used. Boric acid, amino acid (if any), and other additives (if any), are preferably added as aqueous solutions, if available.

The adhesive formulations can be prepared without any prior pH adjustment of the polychloroprene used or of any other adhesive component that may be present. Suitable natural and synthetic rubbers have high pH values and are, therefore, compatible with polychloroprene. Adhesive components that have a pH in the range of from about 9.5 to about 13 are generally compatible with the polychloroprene latex and, thus, facilitate formulation.

When it is desired to use the composition, both surfaces to be adhered are coated with the adhesive composition and brought into contact with at least light hand pressure (i.e., such as used in finger bond tests). The composition can be applied to the surfaces by any suitable method, such as brushing, spraying, or rolling. Preferably and conveniently, the composition is applied to the surfaces by spray-coating. Unlike conventional two-part systems, the one-part contact adhesive of the present invention is able to be sprayed from one container, without the need for expensive equipment and monitoring of the ratio of components. Usually coverage is about 1 g to about 10 g (dry weight) per square foot of surface to be adhered, preferably about 4 g to about 6 g per square foot. Suitable spray-coating equipment includes manual spray operators and automated spray operators. Suitable manual spray operators include the BINKS 2001 SS (available from Binks), BINKS HVLP MACH 1 (available from Binks), DEVILBISS MSA-503 (available from DeVilbiss), GRAYCO 800N (available from Grayco), and HVLP GRAYCO OPTIMIZER (available from Grayco). Suitable automated spray operators include the BINKS 61 (available from Binks), DEVILBISS AGX-4303 (available from DeVilbiss), GRAYCO A80ON (available from Grayco), and BINKS HVLPP MACH 1 (available from Binks).

Preferably, the compositions are low pressure tack compositions. That is, after application, within the open time of the composition, only a light pressure is needed to produce a high initial bonding strength, as illustrated by tests such as the finger bond and low pressure tack tests. For example, in the low pressure tack test, the compositions would require a pressure of less than about 0.132 lb./sq. in., and more preferably less than about 0.08 lb./sq. in. Also, such pressure preferably need only be applied briefly, for example for about 1 second, and preferably less than about half a second.

The adhesive compositions of the present invention are used to provide a contact adhesive for a variety of substrates. The materials bonded together can be the same or of different compositions. Suitable substrates include wood; metal, such as cold-rolled steel, galvanized steel, and aluminum,; fabric; paper; foam; plastic, such as polyvinylchloride, polystyrene, polyethylene, polypropylene, and acrylonitrile butadiene styrene (ABS); fiberglass, and materials used to construct high pressure laminates, for example, for counter tops

EXAMPLES

The invention will be further illustrated by the following examples which are illustrative of specific modes of practicing the invention and are not intended as limiting the scope of the appended claims.

Unless otherwise stated, all percentages are percentages by dry weight and those percentages applying to adhesive compositions are by dry weight of the total adhesive component. Parts per hundred (phr), unless otherwise stated, are also parts per hundred of the dry weight of the total adhesive component. Dashes in the tables indicate that no value was noted or that an ingredient was not present. Unless otherwise stated, boric acid was added in the form of a 5% by weight solution in water and glycine was added in the form of an 18% by weight solution in water.

TEST PROCEDURES

Room Temperature Stability (RT Stability)

After preparing a formulation, it is allowed to stand at room temperature (25° C. S.T.P.). If the composition has a shelf life (i.e., the composition has not substantially coagulated, congealed, curdled, separated, settled, or formed non-easily mixable or non-easily dispersible layers so that it may not be usefully or readily applied as a homogeneous, uniform liquid blend by spray-coating methods) that is at least the length of the stability test, the sample is considered stable. Such stability is indicated in the tables by a "Yes". Unless otherwise stated, the stability was noted after a sample had been left to stand for only 24 hours.

Heat Aging At 50° C.

This test is intended to give an indication of long term stability of a particular composition by subjecting it to elevated temperatures. The aqueous formulation is kept in an oven at 50° C. and observed at regular intervals (usually on a daily basis) to see if it has coagulated (so that it may not be readily applied by spray-coating). If coagulation is observed, then the time period at the previous observation is noted as the "Heat age at 50° C." value. If the test is discontinued before coagulation is observed, then the value will be given as "greater than." For example, ">14 days" indicates that the formulation had not coagulated at 14 days and the test was discontinued.

F bond

"F bond" corresponds to the set time. A ½-inch-thick, high load bearing foam (available from Custom Foam of Kitchener, Ontario, Canada, under No. 2080 having a density of 1.2 lb. per cubic foot) is cut into 1 inch by 3 inch strips. The strips are laid side-by-side and coated with the composition to be tested, so that the strips each receive the same coating simultaneously. At time intervals of about 5 seconds to about 15 seconds, one by one, the strips are folded in half to bring the adhesive-coated surfaces into contact. The time elapsed is noted for the first strip which forms a successful bond (i.e., the surfaces do not pull apart in the absence of any applied pressure). The finger bond time is given in seconds.

P bond

"P bond" refers to the time required to form a pinch bond after the composition is applied. A pinch bond is also referred to as a knife-edge bond. Samples are taken of 4 inch cubes of high load bearing foam (available from Custom Foam of Kitchener, Ontario, Canada, under No. 2080 having a density of 1.2 lb. per cubic foot). The samples are placed flat, providing a top face of the cube. The top face has two pairs of parallel, opposing edges. The top face is coated with the adhesive composition to be tested. One pair of opposing edges is then brought into aligned contact so that the center part of the top face is pushed inwards, pinched towards the center of the cube, and the coated surface contacts itself. This is repeated at time intervals of about every 5 seconds to about every 15 seconds. When the first bond holds, the time is noted as the pinch bond time. The time is given in seconds. Typically there is more stress on a pinch bond than a one inch finger bond. Pinch bond time is indicative of the relative rate of strength build, that is, the lower the "pinch bond" time, the more quickly the bond has developed strength.

Pinch Bond Heat Resistance (P/Bond Heat Res.)

This is the temperature at which a pinch bond remains closed for a minimum of 24 hours. Samples are prepared for the composition to be tested by forming a pinch bond (as described above). A sample is then left in an oven at a first temperature (50° C.). If the bond of the sample remains intact at that first temperature, then a second sample will be left in the oven at a second temperature, 10° C. higher than the first. This procedure is repeated until the bond fails or until the temperature used is greater than 82° C. Bond failure is observed by the opening up of the bond (i.e. the separation of the previously bonded surfaces). The highest temperature reached by a sample without failing, for that composition, is noted as the pinch bond heat resistance.

Low Pressure Tack

This is a test of the aggressiveness of an adhesive composition. Like the finger bond test, a ½-inch-thick, high load bearing foam (available from Custom Foam of Kitchener, Ontario, Canada, under No. 2080 having a density of 1.2 lb.

per cubic foot) is cut into 1 inch by 3 inch strips. The strips are coated with the adhesive composition. For the low pressure tack test, after coating the strips, and within the open time for that composition, the strip is folded in half to bring the adhesive-coated surfaces into contact, as for the finger bond test. However, in this test, only a very light pressure is applied (i.e., a pressure of less than about 0.132 lb./sq. in. and higher than 0.08 lb./sq. in.). If bonding is successful, the result of the test is indicated in the Tables as "Yes".

180° Peel, Substrate To Twill

In this test the effectiveness of bonding of a composition is compared for various substrates bonded to a twill fabric. The twill fabric utilized was a one-inch cotton twill tape (available from Rosetrim of Toronto, Ontario, Canada). A surface of the substrate to be compared is coated with the composition being tested and a surface of a twill fabric is triple-coated with the composition leaving a portion uncoated for attachment within a tensile testing machine. The coated surfaces are then contacted to form a bond. The bond is left at room temperature for 24 hours and then at 50° C. for 24 hours to condition the bond and simulate aging. The bonded substrates are then loaded into an INSTRON tensile testing machine. The force required to peel back the fabric (at a rate of 50 mm per minute in a direction 180° to the bond line) is measured. The force is given and recorded in pounds per inch width (piw).

Substrate Adhesion To Foam

An adhesive composition is applied to a foam surface as well as to a particular substrate. The foam is a ½-inch-thick, high load bearing foam (available from Custom Foam of Kitchener, Ontario, Canada, under No. 2080 having a density of 1.2 lb. per cubic foot) and cut into 3 inch by 6 inch strips. The two coated surfaces are contacted to form a bond and, thus, a laminate. The strength of the bond is tested after 24 hours by attempting to manually pull adjacent ends of the laminate simultaneously apart. If the bond is stronger than the foam, the foam will tear before the bond fails which will then be indicated in the tables as a "Yes".

EXAMPLE A

The stability of various polychloroprene compositions was observed with boric acid (according to the invention) and without boric acid. 2 g of 5% boric acid solution was added to each of several 18 g samples of four different polychloroprene dispersions. The dispersions used were LATEX 750 ("750"), AQUASTIK AQS9426 ("9426"), DISPERCOLL C74 ("C74"), and DISPERCOLL C84 ("C84"). The room temperature stability was noted and is indicated in Table 1 under the heading "RT stability." An entry of "Yes" indicates that the sample was stable. That is, there was no indication of coagulation. Then, 3 g of a 2.5% by weight solution of ammonium chloride was added to each of several 17 g samples of the same polychloroprene compositions and the room temperature stability was again noted. Loss of stability was indicated by coagulation or solid formation and is indicated in Table 1 by "solid". As can be seen from the results in Table 1, addition of ammonium chloride, as soon as the pH dropped to less than 10.5, resulted in loss of stability and coagulation of the composition. Although the results are not shown, a similar loss of stability was also noted when diammonium sulfate or dilute hydrochloric acid were added to the samples instead of ammonium chloride. On the other hand, when boric acid was added, the compositions remained stable, even at a pH as low as 7.62.

TABLE 1

| Example | Latex | 5% BORIC ACID | | 2.5% AMMONIUM CHLORIDE | |
|---------|-------|-----|--------------|------|--------------|
|         |       | pH  | RT Stability | pH   | RT Stability |
| A-1     | 750   | 8.0 | Yes          | 10.5 and less | Solid |
| A-2     | 9426  | 8.3 | Yes          | 9.5 and less  | Solid |
| A-3     | C74   | 8.4 | Yes          | 9.2 and less  | Solid |
| A-4     | C84   | 7.6 | Yes          | 9.0 and less  | Solid |

EXAMPLE 1A

This example compares the fast-set activation of various types of polychloroprene dispersion with three types of latent internal coagulants: glycine, boric acid, and a mixture of glycine and boric acid. The comparison was made using pinch bond time and finger bond time values. The type of polychloroprene used is indicated in the Table 2. First the polychloroprene was used without additives, in its commercially available form. The pinch bond time, finger bond time, and pH were measured and noted. Then, to the same types of polychloroprene was added 4 g of glycine per 100 g polychloroprene and the bond times and pH were again noted. 1.7 g of boric acid was then added per 100 g of polychloroprene and the bond times and pH noted. Finally, to the same types of polychloroprene was added 1.25 g of boric acid and 2 g of glycine per 100 g of polychloroprene. The bond times and pH were again noted. The results are shown in Table 2.

Since these examples compare bond times for bonding foam, values above 90 seconds were not considered preferable. Therefore, samples which had not bonded at 90 seconds were recorded as ">90".

It can be seen from Table 2 that the values of the set times for the polychloroprene without additives were too high. Although some finger bond times for the compositions containing glycine were better, the pinch bond times were still too high to be preferred. With the addition of boric acid, the values were clearly improved, and the addition of a mixture of glycine and boric acid gave some excellent values.

TABLE 2

| | | No additives pH Range 9.5 to 13.0 Bond Time (sec.) | | Glycine pH Range 8.2 to 9.2 Bond Time (sec.) | | Boric Acid pH Range 8.2 to 9.1 Bond Time (sec.) | | Glycine/Boric Acid pH Range 8.1 to 9.3 Bond Time (sec.) | |
|---------|----------------|--------|--------|--------|--------|--------|--------|--------|--------|
| Example | polychloroprene | F Bond | P Bond | F Bond | P Bond | F Bond | P Bond | F Bond | P Bond |
| 1A-1    | 750            | >90    | >90    | 90     | >90    | 30     | >90    | 40     | >90    |
| 1A-2    | C74            | >90    | >90    | 30     | >90    | 10     | >90    | 10     | 30     |
| 1A-3    | 2920           | >90    | >90    | 90     | >90    | 30     | 60     | 35     | >90    |
| 1A-4    | 735            | >90    | >90    | >90    | >90    | 10     | >90    | 20     | 90     |

TABLE 2-continued

| | | No additives pH Range 9.5 to 13.0 Bond Time (sec.) | | Glycine pH Range 8.2 to 9.2 Bond Time (sec.) | | Boric Acid pH Range 8.2 to 9.1 Bond Time (sec.) | | Glycine/Boric Acid pH Range 8.1 to 9.3 Bond Time (sec.) | |
|---|---|---|---|---|---|---|---|---|---|
| Example | polychloroprene | F Bond | P Bond | F Bond | P Bond | F Bond | P Bond | F Bond | P Bond |
| 1A-5 | C84 | >90 | >90 | 10 | 30 | 10 | 20 | <5 | 20 |
| 1A-6 | 9426 | >90 | >90 | 70 | >90 | 30 | 60 | 10 | 60 |

EXAMPLE 1B

The following examples compare the heat age stability at 50° C. and the finger bond times between polychloroprene dispersions having added glycine and the same dispersions having added boric acid instead of glycine, at three different pH levels: 10.5, 9.5, and 8.5. The purpose of this example was to compare compositions having boric acid (according to the invention) with compositions having no boric acid, only glycine.

A 15% glycine solution was added to 1,000 g samples of DISPERCOLL C84 polychloroprene latex until the desired pH was reached. The finger bond times and heat age stability at 50° C. were noted. Then, 4.5% boric acid solution was added to 1,000 g samples of the same polychloroprene latex until the desired pH was reached. The finger bond times and heat age stability at 50° C. were noted. The results are shown in Table 2a. It can be seen that at lower pH values, heat age stability is much better for the compositions containing the boric acid.

TABLE 2a

| | Glycine | | | Boric Acid | | |
|---|---|---|---|---|---|---|
| Example | pH | F Bond (sec.) | Heat Age Stability at 50° C. | pH | F bond (sec.) | Heat Age Stability at 50° C. |
| 1B-1 | 10.5 | >180 | >14 days | 10.5 | >180 | >14 days |
| 1B-2 | 9.5 | 60 | 13 days | 9.5 | 5 | >14 days |
| 1B-3 | 8.5 | Immed. | 2 days | 8.5 | Immed | >14 days |

EXAMPLE 2A

The following examples compare compositions with different tackifiers. Each of the compositions included 3 g of boric acid (added in the form of a 5% aqueous solution) per hundred parts of total adhesive component. The adhesive component used was DISPERCOLL C84. The tackifiers used were SE1055, DERMULSENE DT ("DT"), DERMULSENE DT 50 ("DT 50"), TACOLYN 5001 ("TAC 5001"), TACOLYN 5002 ("TAC 5002") and ESCOREZ 9271 as shown in Table 3. Results are shown for two different quantities for each tackifier: 15 phr and 30 phr. After preparation, each formulation was measured for pH, low pressure tack, bond time and room temperature (RT) stability, as described previously. As shown in the table, all the formulations are storage stable when stored at room temperature for 24 hours and have acceptable low-pressure tack and 5 second or less finger bond times. Thus, they are particularly preferred compositions according to the present invention. The results are shown in Table 3.

TABLE 3

| Component/Property | 2A-1 | 2A-2 | 2A-3 | 2A-4 | 2A-5 | 2A-6 | 2A-7 | 2A-8 | 2A-9 | 2A-10 | 2A-11 | 2A-12 |
|---|---|---|---|---|---|---|---|---|---|---|---|---|
| C84 | 100 | 100 | 100 | 100 | 100 | 100 | 100 | 100 | 100 | 100 | 100 | 100 |
| 5% Boric Acid | 3 phr | 3 phr | 3 phr | 3 phr | 3 phr | 3 phr | 3 phr | 3 phr | 3 phr | 3 phr | 3 phr | 3 phr |
| SE1055 | 15 phr | 30 phr | — | — | — | — | — | — | — | — | — | — |
| DT | — | — | 15 phr | 30 phr | — | — | — | — | — | — | — | — |
| DT50 | — | — | — | — | 15 phr | 30 phr | — | — | — | — | — | — |
| TAC5001 | — | — | — | — | — | — | 15 phr | 30 phr | — | — | — | — |
| TAC5002 | — | — | — | — | — | — | — | — | 15 phr | 30 phr | — | — |
| ESCOREZ 9271 | — | — | — | — | — | — | — | — | — | — | 15 phr | 30 phr |
| pH | 8.2 | 8.3 | 8.2 | 8.2 | 8.2 | 8.3 | 8.2 | 8.3 | 8.1 | 8.2 | 8.1 | 8.2 |
| Low Pressure Tack | Yes | Yes | Yes | Yes | Yes | Yes | Yes | Yes | Yes | Yes | Yes | Yes |
| F Bond (sec.) | 5 or less | 5 or less | 5 or less | 5 or less | 5 or less | 5 or less | 5 or less | 5 or less | 5 or less | 5 or less | 5 or less | 5 or less |
| RT Stability | Yes | Yes | Yes | Yes | Yes | Yes | Yes | Yes | Yes | Yes | Yes | Yes |

EXAMPLE 2B

Four different polychloroprene adhesive compositions were prepared and tested for finger and pinch bond times. The polychloroprene was DISPERCOLL C84. Each of the compositions included both boric acid and glycine, zinc oxide as an acid acceptor (in the form of a 60% by weight solution or dispersion in water), OCTOLITE 640 as an antioxidant, and one of four tackifiers: DERMULSENE 92, DERMULSENE 85, DERMULSENE DT, or TACOLYN 5001. The quantities of the ingredients are shown in Table 4 in parts per hundred (phr) of the polychloroprene. As shown in the table, the bond times are low, as is desired in a fast-setting adhesive. Each of these formulations was also stable at elevated temperature (heat aging at 50° C. for 21 days).

TABLE 4

| Example | 2B-1 | 2B-2 | 2B-3 | 2B-4 |
|---|---|---|---|---|
| Zinc Oxide (phr) | 1 | 1 | 1 | 1 |
| 18% Glycine (phr) | 2 | 2 | 2 | 2 |
| 5% Boric Acid (phr) | 1.25 | 1.25 | 1.25 | 1.25 |
| Octolite 640 (phr) | 0.5 | 0.5 | 0.5 | 0.5 |
| Dermulsene 92 (phr) | 15 | — | — | — |
| Dermulsene 85 (phr) | — | 15 | — | — |
| Dermulsene DT (phr) | — | — | 15 | — |
| Tacolyn 5001 (phr) | — | — | — | 15 |
| F Bond (sec.) | <5 | <5 | 10 | <5 |
| P Bond (sec.) | 20 | 20 | 45 | 20 |

EXAMPLE 3

Five formulations were prepared in which the adhesive component was a combination of two different types of polychloroprene in five different weight ratios. The two polychloroprenes used were DISPERCOLL C74 ("C74"), a high softening point (i.e., a high glass-transition temperature) polychloroprene latex, and DISPERCOLL C84 ("C84"), a low softening point (i.e., a low glass-transition temperature) polychloroprene latex. A mixture of boric acid and glycine was used as the internal coagulant. Zinc oxide was also added as an acid acceptor in the form of a 60% by weight solution or dispersion in water. OCTOLITE 640 was added as an antioxidant. These formulations were then tested for finger and pinch bond times and pinch bond heat resistance and the pH was noted. The pinch bond heat resistance for each of these formulations was tested for 28 days at the temperature indicated. The quantities and results are shown in Table 5. It can be seen from the table that the bond time values are low, indicating fast set times. Again, the results show the effectiveness of the boric acid/glycine mixture as an internal coagulant.

TABLE 5

| Example | 3-1 | 3-2 | 3-3 | 3-4 | 3-5 |
|---|---|---|---|---|---|
| Ratio C74:C84 | 9:1 | 3:1 | 1:1 | 1:3 | 1:9 |
| 60% ZnO (phr) | 2 | 2 | 2 | 2 | 2 |
| 18% Glycine (phr) | 2 | 2 | 2 | 2 | 2 |
| 5% Boric (phr) | 1.25 | 1.25 | 1.25 | 1.25 | 1.25 |
| pH | 8.50 | 8.50 | 8.59 | 8.64 | 8.68 |
| F Bond (sec.) | <5 | <5 | <5 | <5 | <5 |
| P Bond (sec.) | 25 | 25 | 20 | 15 | 15 |
| Pinch Bond Heat Resistance | 80° C. | 80° C. | 80° C. | 70° C. | 60° C. |

EXAMPLE 4A

Three compositions were prepared using a boric acid and glycine mixture as an internal coagulant. In the first composition, the adhesive component was DISPERCOLL C84 ("C84"). In the second and third compositions, the adhesive component was a 1:1 by weight blend of DISPERCOLL C74 and DISPERCOLL C84 ("C74/C84"). OCTOLITE 640 was added as an antioxidant. Zinc oxide was added as an acid acceptor in the form of a 60% solution or dispersion in water. TACOLYN 5002 was added as a tackifier. The % solids and pH were noted. The finger bond time, pinch bond time and pinch bond heat resistance were measured. The heat resistance values are for 28 days. Samples of the three compositions were allowed to stand at room temperature. As can be seen from the table, after 8 months, there was still no sign of coagulation in the samples. Thus, they are particularly preferred storage stable compositions in accordance with the present invention. Table 6 shows the quantities and the results.

TABLE 6

| Example | 4A-1 | 4A-2 | 4A-3 |
|---|---|---|---|
| adhesive (ratio by weight) | C84 | C74/C84 (1:1) | C74/C84 (1:1) |
| 18% Glycine (phr) | 2 | 2 | 2 |
| 5% Boric Acid (phr) | 1.25 | 1.25 | 1.25 |
| ZnO (phr) | 1 | 1 | 1 |
| Octolite 640 (phr) | 0.5 | 0.75 | 0.5 |
| Tacolyn 5002 (phr) | 0 | 0 | 20 |
| % Solids | 47.8 | 48.6 | 48.8 |
| pH | 8.93 | 8.6 | 8.96 |
| F Bond (sec.) | <5 | <5 | <5 |
| P Bond (sec.) | 15–20 | 15–20 | 15–20 |
| P Bond Heat Resistance | 60° C. | 80° C. | 60° C. |
| RT Stability (8 months) | Yes | Yes | Yes |

EXAMPLE 4B

The same three compositions as in Example 4A (4A-1, 4A-2 and 4A-3) were tested for bonding between various substrates used in the furniture industry. Seven substrates were tested after first being cleaned, where necessary: acrylonitrile butadiene styrene (ABS), polyethylene, polypropylene, polyvinylchloride (PVC), aluminum, galvanized steel, and cold-rolled steel (CRS). Two test procedures were used. Table 7 shows the results of testing the compositions in the 180° peel substrate to twill test for adhesion. Table 8 shows the results of testing the compositions in the substrate adhesion to foam test.

TABLE 7

Substrate Adhesion (180° peel substrate to twill)

| Example | Composition Substrate | 4A-1 | 4A-2 | 4A-3 |
|---|---|---|---|---|
| 4B-1 | ABS | 1.6 | 2.0 | 1.5 |
| 4B-2 | Polyethylene | 0.4 | 1.5 | 0.9 |
| 4B-3 | Polypropylene | 1.0 | 0.9 | 1.5 |
| 4B-4 | PVC | 1.7 | 1.9 | 2.0 |
| 4B-5 | Aluminum | 0.9 | 1.1 | 0.7 |
| 4B-6 | Galvanized Steel | — | 1.1 | — |
| 4B-7 | CRS | 0.7 | 1.1 | 0.9 |

Unit: pounds per inch width (piw)

TABLE 8

Substrate Adhesion to Foam
(24 hr. foam tear, substrate to foam)

| Example | Composition Substrate | 4A-1 | 4A-2 | 4A-3 |
|---|---|---|---|---|
| 4B-8 | ABS | yes | yes | yes |
| 4B-9 | Polyethylene | yes | yes | yes |
| 4B-10 | Polypropylene | yes | yes | yes |
| 4B-11 | PVC | yes | yes | yes |
| 4B-12 | Aluminum | yes | yes | yes |
| 4B-13 | Galvanized Steel | yes | yes | yes |
| 4B-14 | CRS | yes | yes | yes |

EXAMPLE 5A

Three compositions were prepared using, as adhesive component, three different blends of a commercially available polychloroprene latex, DISPERCOLL C84 ("C84"), and a synthetic rubber, ROVENE 8329 ("8329"). A mixture of glycine and boric acid was used as an internal coagulant. The following measurements were made: low pressure tack, finger bond time, pinch bond time, and pinch bond heat resistance at 50° C. The quantities and results are shown in Table 9.

TABLE 9

| Example | 5A-1 | 5A-2 | 5A-3 |
| --- | --- | --- | --- |
| Ratio C84:8329 (by wt.) | 4:1 | 2:1 | 1:1 |
| 18% Glycine (phr) | 2 | 2 | 2 |
| 5% Boric (phr) | 1.25 | 1.25 | 1.25 |
| Heat Age Stability at 50° C. | >14 days | >14 days | >14 days |
| Low Pressure Tack | Yes | Yes | Yes |
| F Bond (sec.) | <10 sec. | <10 sec. | 10 sec. |
| P Bond (sec.) | — | — | 55 sec. |
| P Bond Heat Resistance at 50° C. | Yes | Yes | Yes |

EXAMPLE 5B

Five more compositions were prepared. In examples 5B-1, 5B-2 and 5B-5, the adhesive component was a blend of DISPERCOLL C74 and ROVENE 8329, DISPERCOLL C84 and ROVENE 8329, and DISPERCOLL C74 and DISPERCOLL C84, respectively. In examples 5B-3 and 5B-4, the adhesive was solely DISPERCOLL C74 and DISPERCOLL C84, respectively. Each composition also had zinc oxide (added in the form of a 60% solution or dispersion in water) and OCTOLITE 640. Glycine and boric acid were used as internal coagulants and AQUATAC 4188 was used as a tackifier. After preparation, the compositions were tested for: heat age at 50° C., low pressure tack, finger bond time, pinch bond time, and pinch bond heat resistance. The quantities and results are shown in Tables 10A and 10B. In Table 10B, "immed." means bonding was successful immediately.

TABLE 10A

| Example | 5B-1 | 5B-2 |
| --- | --- | --- |
| Ratio C74: Rovene 8329 (by wt.) | — | 1:1 |
| Ratio C84: Rovene 8329 (by wt.) | 1:1 | — |
| ZnO (phr) | 2 | 2 |
| Octolite 640 (phr) | 1 | 1 |
| 18% Glycine (phr) | 2 | 2 |
| 5% Boric acid (phr) | 1.25 | 1.25 |
| Aquatac 4188 (phr) | 20 | 20 |
| Heat Age Stability at 50° C. | >7 days | >7 days |
| Low Pressure Tack | Yes | Yes |
| F Bond (sec.) | 15 | 90 |
| P Bond (sec.) | 120 | 330 |
| P Bond Heat Resistance | 50° C. | 60° C. |

TABLE 10B

| Example | 5B-3 | 5B-4 | 5B-5 |
| --- | --- | --- | --- |
| C74 | — | 100 | 50 |
| C84 | 100 | — | 50 |
| ZnO (phr) | 2 | 2 | 2 |
| Octolite 640 (phr) | 1 | 1 | 1 |
| 18% Glycine (phr) | 2 | 2 | 2 |
| 5% Boric acid (phr) | 1.25 | 1.25 | 1.25 |
| Aquatac 4188 (phr) | 20 | 20 | 20 |
| Heat Age Stability at 50° C. | >14 days | >14 days | >14 days |
| Low Pressure Tack | Yes | Yes | Yes |
| F Bond | Immed. | Immed. | Immed. |
| P Bond (sec.) | 35 | 50 | 45 |
| P Bond Heat Resistance | 50° C. | 60° C. | 60° C. |

COMPARATIVE EXAMPLE

For the purpose of comparison, a number of compositions were made by using, as an adhesive component, a blend of various polychloroprenes with various acrylate compounds that are not synthetic or natural rubbers. The acrylate compounds may be described as acrylate acidic ester copolymers. The polychloroprene dispersions used were DISPERCOLL C84 ("C84"), AQUASTIK AQS ("9426"), and LATEX 750 ("750"). The acrylate compounds were RHOPLEX E32 (pH 3.0), E-358 (pH 8.0), LC40 (pH 4.5), and ROBOND 9631 (pH 6.4), all of which are available from ROHM and HAAS Company. The weight ratio of the polychloroprene to the acrylate compound is shown in Table 11. Each of the formulations also contained 1.25 phr 5% boric acid and 2.0 phr 18% glycine based on one hundred parts of the dry weight of the total adhesive component. The finger bond times were noted for each formulation. The results are shown in Table 11. As can be seen from the table, the results are not as good as those compositions that do not contain such acrylate compounds. Most of the finger bonds took more than 180 seconds to bond.

TABLE 11

| Example | Blend | Blend Ratio | F Bond (sec) |
| --- | --- | --- | --- |
| C-1 | C84/Rhoplex E32 | 1.2 | 120 |
| C-2 | C84/Rhoplex 358 | 0.92 | 40 |
| C-3 | C84/Rhoplex LC40 | 1.1 | >180 |
| C-4 | C84/Rhoplex 9631 | 1.15 | 60 |
| C-5 | 9426/Rhoplex E32 | 1.26 | >180 |
| C-6 | 9426/Rhoplex 358 | 0.97 | >180 |
| C-7 | 9426/Rhoplex LC40 | 1.05 | >180 |
| C-8 | 9426/Rhobond 9631 | 1.2 | >180 |
| C-9 | 750/Rhoplex E32 | 1.13 | >180 |
| C-10 | 750/Rhoplex E358 | 0.87 | >180 |
| C-11 | 750/Rhoplex LC40 | 0.95 | >180 |
| C-12 | 750/Rhoplex 9631 | 1.08 | >180 |

While particular embodiments of the invention have been described, it will be understood, of course, that the invention is not limited thereto since many obvious modifications can be made, and it is intended to include within this invention any such modification as will fall within the scope of the appended claims.

What is claimed is:

1. A storage stable, fast-setting, aqueous contact adhesive composition comprising an adhesive component, an amino acid, and boric acid, wherein the adhesive component comprises at least one polychloroprene, is substantially free of acrylates, and wherein the composition is a one-part composition.

2. The adhesive composition according to claim 1, wherein the pH of the composition is from about 7 to about 9.

3. The adhesive composition according to claim 1, wherein the pH of the composition is from about 8 to about 8.9.

4. The adhesive composition according to claim 1, wherein the pH of the composition is from about 8.5 to about 8.8.

5. The adhesive composition according to claim 1, wherein the amino acid is glycine.

6. The adhesive composition according to claim 1, wherein the amino acid is present in an amount of about 1.5% to about 2.5% by weight based on dry weight of the adhesive component.

7. The adhesive composition according to claim 1, wherein the amino acid is present in an amount of about 0.5% to about 5% by weight based on dry weight of the adhesive component.

8. The adhesive composition according to claim 1, wherein the boric acid is present in an amount of about 0.1% to about 6% by weight based on dry weight of the adhesive component.

9. The adhesive composition according to claim 1, wherein the boric acid is present in an amount of about 0.8% to about 1.5% by weight based on dry weight of the adhesive component.

10. The adhesive composition according to claim 1, wherein the adhesive component is at least one anionic surfactant-stabilized polychloroprene dispersion or anionic/nonionic surfactant-stabilized polychloroprene blend dispersion.

11. The adhesive composition according to claim 1, wherein the adhesive component comprises at least one polychloroprene and at least one natural rubber, synthetic rubber, or combinations thereof.

12. The adhesive composition according to claim 1, wherein the adhesive composition is able to be applied to a substrate by spraying from one container.

13. The adhesive composition according to claim 1, wherein the composition has a set time of about five seconds or less.

14. The adhesive composition according to claim 1, wherein the composition is storage stable for at least 6 months at room temperature.

15. The adhesive composition according to claim 1, wherein the composition is storage stable for at least 8 months at room temperature.

16. The adhesive composition according to claim 1, wherein the pH of the composition is from about 8.5 to about 8.8 and the boric acid is present in an amount of about 0.8% to about 1.5% by weight based on dry weight of the adhesive component.

17. The adhesive composition according to claim 16, wherein the amino acid comprises glycine.

18. The adhesive composition according to claim 17, wherein the glycine is present in an amount of about 1.5% to about 2.5% by weight based on dry weight of the adhesive component.

19. The adhesive composition according to claim 18, wherein the composition is storage stable for at least 6 months at room temperature.

20. The adhesive composition according to claim 18, wherein the composition is storage stable for at least 8 months at room temperature.

21. The adhesive composition according to claim 20, wherein the adhesive component comprises at least one polychloroprene and at least one natural rubber, synthetic rubber, or combinations thereof.

22. The adhesive composition according to claim 18, wherein the adhesive component comprises at least one polychloroprene and at least one natural rubber, synthetic rubber, or combinations thereof.

23. The adhesive composition according to claim 1, wherein the boric acid is generated in-situ.

24. The one-part aqueous contact adhesive composition according to claim 1 wherein the composition is storage stable for at least 4 months at room temperature.

25. A substrate coated with the adhesive composition of claim 1.

26. A spray-coating apparatus containing an adhesive composition according to claim 1.

* * * * *